United States Patent
Ueda et al.

(10) Patent No.: US 7,466,754 B2
(45) Date of Patent: * Dec. 16, 2008

(54) HEADER-ESTIMATING MOVING PICTURE RECEIVING APPARATUS AND OUTPUT APPARATUS

(75) Inventors: Yoshihiro Ueda, Tokyo (JP); Akiko Hayashita, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 210 days.

This patent is subject to a terminal disclaimer.

(21) Appl. No.: 11/299,759

(22) Filed: Dec. 13, 2005

(65) Prior Publication Data

US 2006/0088108 A1  Apr. 27, 2006

Related U.S. Application Data

(62) Division of application No. 09/838,585, filed on Apr. 20, 2001, now Pat. No. 7,006,574.

(30) Foreign Application Priority Data

Jul. 7, 2000  (JP) ............................. 2000-206929

(51) Int. Cl.
*H04N 7/12* (2006.01)
*H04N 11/02* (2006.01)

(52) U.S. Cl. ............................. 375/240.25; 375/240.26

(58) Field of Classification Search ................................
375/240.01–240.07, 240.12–240.16, 240.24–240.26
See application file for complete search history.

(56) References Cited

U.S. PATENT DOCUMENTS

| 5,745,502 | A | 4/1998 | Khayrallah et al. |
| 5,745,524 | A * | 4/1998 | Hull ............................ 375/244 |
| 5,870,521 | A | 2/1999 | Shimoda |
| 5,907,660 | A | 5/1999 | Inoue et al. |
| 5,926,573 | A * | 7/1999 | Kim et al. .................... 382/239 |
| 6,331,829 | B2 | 12/2001 | Kawai |
| 6,384,749 | B1 * | 5/2002 | Park ............................. 341/94 |
| 6,597,741 | B1 * | 7/2003 | Miyazaki ............... 375/240.25 |
| 6,647,061 | B1 * | 11/2003 | Panusopone et al. ... 375/240.12 |
| 7,006,574 | B2 * | 2/2006 | Ueda et al. ............. 375/240.25 |

* cited by examiner

*Primary Examiner*—David Czekaj
(74) *Attorney, Agent, or Firm*—Venable LLP; Michael A. Sartori; Kyle D. Petaja

(57) ABSTRACT

A receiving apparatus receives a bitstream that is divided into units encoding a moving picture and includes a stream header indicating how the units are to be decoded. The receiving apparatus estimates the contents of the stream header from the contents of the units, so that decoding of the units can begin before the stream header is received. The receiving apparatus preferably checks for errors in the analysis and decoding of the units, and modifies the estimated stream-header information when an error is discovered. The same unit may be analyzed and decoded repeatedly to hasten the correct estimation of the stream-header information.

2 Claims, 6 Drawing Sheets

HEADER-ESTIMATING MOVING PICTURE RECEIVING APPARATUS AND OUTPUT APPARATUS

CROSS REFERENCE TO RELATED APPLICATION

This application is a divisional of U.S. application Ser. No. 09/838,585 filed Apr. 20, 2001, which claims priority of Japan Application No. 2000-206929 filed Jul. 7, 2000, and which is incorporated herein by reference.

BACKGROUND OF THE INVENTION

The present invention relates to apparatus for receiving moving pictures.

It has become common to transmit moving pictures as coded bitstreams. Various types of headers are embedded in these bitstreams: examples include a stream header that describes the coding format of the moving picture as a whole, a frame header that describes the coding format of a particular frame, and a packet header that describes the coding format of a packet. The apparatus that receives the bitstream analyzes the header information and decodes the bitstream accordingly.

The stream header, which includes such basic information as the picture size and the general type of coding employed throughout the bitstream, may be placed at the beginning of the bitstream, or may be repeated at suitable intervals in the bitstream, so that the bitstream can be decoded from an intermediate point. The stream header may also be transmitted on a separate channel from the bitstream itself.

A frame header, which is inserted at the beginning of a frame, includes information pertaining to the coding of the frame, such as the method of prediction of the frame and picture quality parameters. The content of the frame headers varies, depending on the stream header.

When a frame is divided into packets, the packet headers include such information as the block number of the first block in the packet. (For coding purpose, a frame is divided into rectangular blocks of pixels, commonly into 16×16 blocks of pixels.) The packet headers may also include information similar to that in the frame headers, so that the packet contents can be decoded even if a preceding packet was lost. The frame header itself may be treated as a type of packet header in this case.

In the decoding process, first the stream header is analyzed; then the other headers are analyzed on the basis of the stream header, and the data are decoded on the basis of the header information. If reception of the bitstream starts at an intermediate point, decoding cannot begin until a stream header is received in the bitstream, or until a stream header is obtained from another channel.

Various strategies are used to conceal packet loss and other types of data loss or corruption. When part of a frame is missing, the missing part may be interpolated from the other parts of the frame, enabling display of the moving picture to continue without interruption. Alternatively, the damaged frame may be replaced by the preceding frame; in this case, several succeeding frames may also have to be replaced by the preceding frame, until a frame that was coded non-predictively (an intra-frame) is received.

One problem found in conventional receiver apparatus is that decoding cannot begin until a stream header has been received. Moreover, even when a stream header is received, it is not possible to start decoding immediately unless the frame that follows the stream header is an intra-frame. The reason is that the conventional apparatus discards frames received before the stream header, and cannot decode predictively coded frames (inter-frames) that refer back to the discarded frames.

Solving this problem by frequent insertion of stream headers, each followed by an intra-frame, is unattractive because intra-frame coding is inefficient. Each time an intra-frame is inserted, it is necessary to increase the amount of coded data or decrease the picture quality, or do both. Increasing the amount of coded data tends to delay transmission of the data, so in real-time transmission, it may be impossible to insert frequent intra-frames. Some transmitters take the extreme measure of transmitting only one intra-frame, at the beginning of the bitstream, making it impossible to start decoding from an intermediate point.

In a packet transmission environment in which packet loss occurs, inadequate error concealment causes other problems. The decoded picture may be distorted, for example, or may disappear or freeze for extended periods of time, to the consternation of the viewer.

SUMMARY OF THE INVENTION

An object of the present invention is to enable the decoding of a bitstream to begin quickly from an intermediate point.

Another object of the invention is to reduce psychological stress during protracted picture outage.

The invented receiving apparatus receives a bitstream that is divided into units and includes a stream header indicating how the units are to be decoded. The receiving apparatus has a stream-header estimator that estimates the contents of the stream header from the contents of the units. This enables decoding of the units to begin before the stream header is received.

The units may include respective unit headers, which are analyzed on the basis of the stream header. The receiving apparatus then preferably includes a first error checker that checks the analyzed unit header information for errors, and instructs the stream-header estimator to modify the estimated stream-header information if an error is found.

The receiving apparatus may also include a decoder that decodes the unit data according to the analyzed unit header information, and a second error checker that checks the decoded unit data for errors. When the second error checker finds an error, it instructs the stream-header estimator to modify the estimated stream-header information. The process of decoding the same unit data, checking for errors, and modifying the estimated stream-header information may be repeated until a predetermined condition is satisfied.

The invention also provides a picture output apparatus that receives decoded results from, for example, the invented receiving apparatus, and generates picture-unit signals for the display of a moving picture on a screen. The picture output apparatus includes a decoded picture-unit generator that generates decoded picture-unit signals from the decoded results, a reference frame store that temporarily stores the decoded picture-unit signals for reference, and an output candidate checker that compares the decoded picture-unit signals with the decoded picture-unit signals already stored for reference and decides whether to output the decoded picture-unit signals.

The picture output apparatus may also include a substitute picture generator that generates a substitute unit signal for display on the screen in periods during which the output candidate checker continually decides not to display the decoded picture-unit signals. The substitute unit signal indicates the operating status of the picture output apparatus, thereby reassuring the viewer that the apparatus is working.

DETAILED DESCRIPTION OF THE INVENTION

Figure 1:
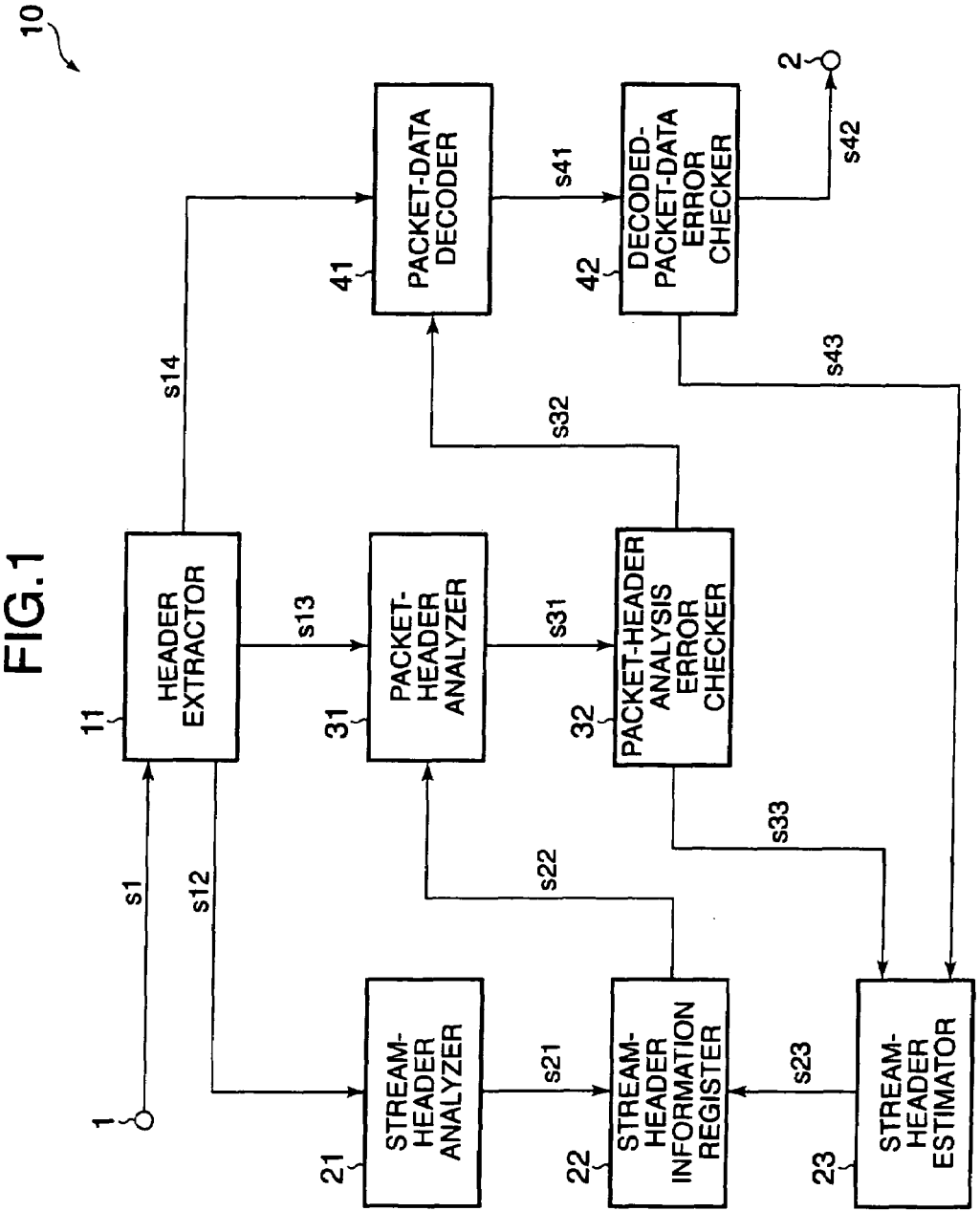
FIG. 1 is a block diagram of a receiving apparatus embodying the present invention.

Embodiments of the invention will be described with reference to the attached drawings, in which like parts are indicated by like reference characters.

Referring to FIG. 1, the first embodiment is a receiving apparatus 10 having an input terminal 1, an output terminal 2, a header extractor 11, a stream-header analyzer 21, a stream-header information register 22, a stream-header estimator 23, a packet-header analyzer 31, a packet-header analysis error checker 32, a packet-data decoder 41, and a decoded-packet-data error checker 42.

Figure 2:
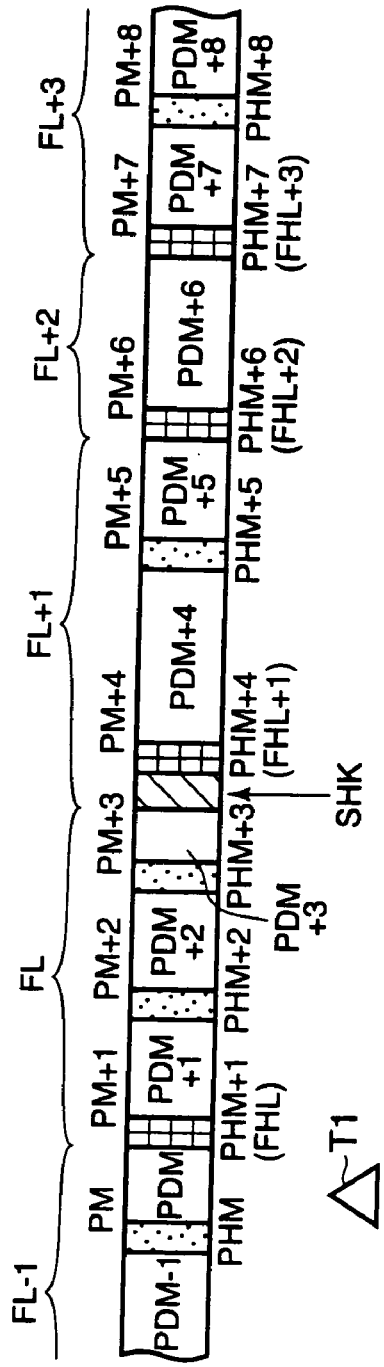
FIG. 2 shows the structure of a bitstream.

The input terminal 1 normally receives an input bitstream s1 having the structure shown in FIG. 2, comprising consecutively numbered frames FL and packets PM, L and M being non-negative integers. A frame includes one or more packets. In the drawing, frame FL includes three packets PM+1, PM+2, PM+3, frame FL+1 includes two packets PM+4, PM+5, and frame FL+2 includes one packet PM+6. Each packet PM includes a packet header PHM and packet data PDM. The packet header of the first packet in a frame is also the frame header. For example, the packet header PHM+1 of packet PM+1 is also the frame header FHL of frame FL. Consecutively numbered stream headers SHK (K being another non-negative integer) are inserted into the bitstream from time to time, e.g., between packets PM+3 and PM+4.

Figure 3:
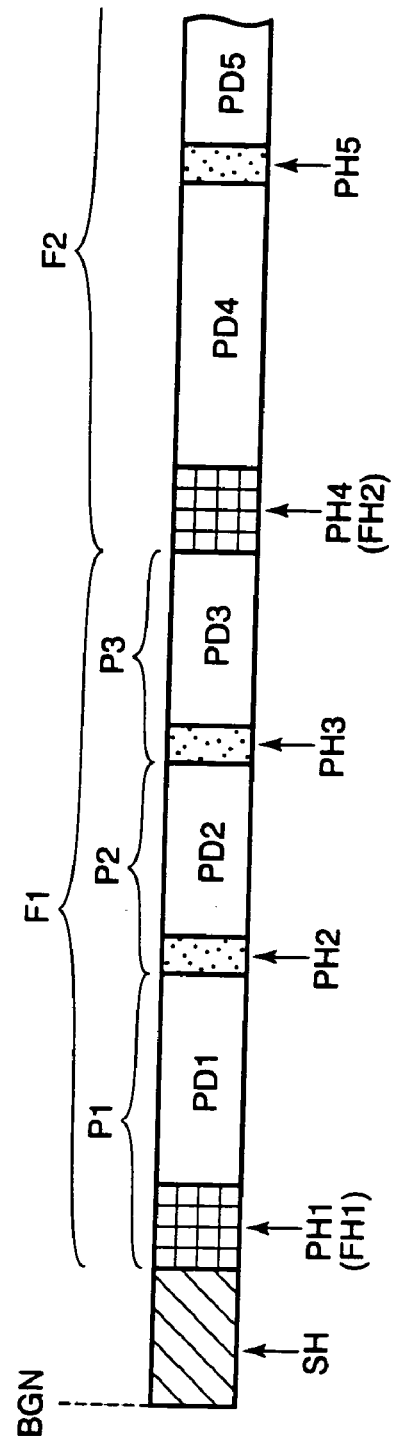
FIG. 3 shows the structure of another bitstream.

If the receiving apparatus 10 performs a handshaking procedure with the transmitting apparatus (not visible) before transmission of the bitstream begins, the bitstream may have the alternative structure shown in FIG. 3, with a single stream header SH placed at the beginning BGN. If the bitstream is broadcast to multiple users, however, each of whom may begin receiving at an unpredictable time, then the format shown in FIG. 2 must be used.

Referring again to FIG. 1, the input bitstream s1 is sent to the header extractor 11, which separates the stream headers and packet headers from the packet data, thereby generating a stream header signal s12, a packet header signal s13, and a packet data signal s14. These signals are supplied to the stream-header analyzer 21, packet-header analyzer 31, and packet-data decoder 41, respectively.

Figure 4:
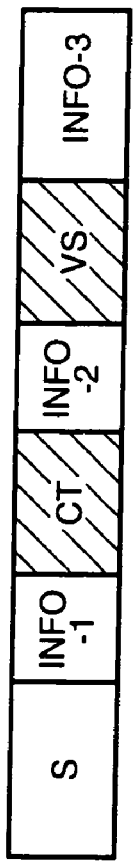
FIG. 4 shows the structure of a stream header.

A stream header has the structure shown in FIG. 4, beginning with a start code S having a predetermined bit pattern, and continuing with various information fields. Of particular importance for the decoding process are a coding type field CT and a video size field VS. The coding type field CT identifies the way in which the packet data have been coded. Huffman coding is one example of a type of coding that can be used. The video size field identifies the size of the decoded picture. Typical sizes include the video graphics array (VGA) size (640×480 pixels) and the common intermediate format (CIF) size (352×288 pixels). The other information fields (info-1, info-2, info-3) include information that is less important for decoding, such as a time stamp generated at the transmitting apparatus.

The stream-header analyzer 21 analyzes the information in the various fields of each stream header, and stores the stream-header information s21 obtained from this analysis in the stream-header information register 22.

The stream-header information register 22 also stores estimated stream-header information s23 received from the stream-header estimator 23. If the stream-header analyzer 21 and stream-header estimator 23 simultaneously generate stream-header information to be stored in the stream-header information register 22, the stream-header information register 22 preferentially stores the stream-header information s21 generated by the stream-header analyzer 21, because it is normally more reliable. The information stored in the stream-header information register 22 is supplied as stream-header information s22 to the packet-header analyzer 31.

The packet-header analyzer 31 analyzes the packet header signal s13 received from the header extractor 11 according to the stream-header information s22 received from the stream-header information register 22. The results are sent as analyzed packet-header information s31 to the packet-header analysis error checker 32. Since some of the packet headers also function as frame headers, the packet-header analyzer 31 also performs frame-header analysis, and the analyzed packet-header information s31 includes analyzed frame-header information.

The frame headers may have different structures, depending on the coding type specified in the CT field of the stream header. For example, the frame headers may have the structure shown in FIG. 5 if the CT field specifies a certain coding type A, and the different structure shown in FIG. 6 if the CT field specifies another coding type B.

Figures 5, 6:
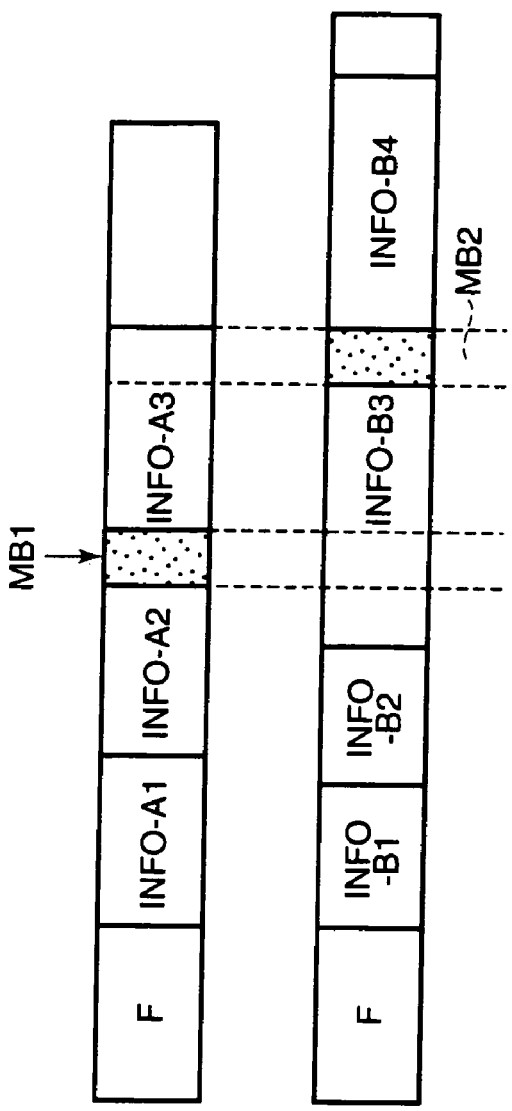
FIG. 5 shows the structure of a frame header having one format.
FIG. 6 shows the structure of a frame header having another format.

The frame header in FIG. 5 begins with a start code F having a predetermined bit pattern, and continues with several information fields (info-A1, info-A2, info-A3, . . . ) A marker bit MB1 having a fixed value of '1' is inserted in a predetermined position among the information fields.

The frame header in FIG. 6 also begins with a start code F having a predetermined bit pattern. The start code F is followed by different information fields (info-B1, info-B2, info-B3, info-B4, . . . ) and a marker bit MB2. Marker bit MB2 has the same fixed value of '1' as marker bit MB1, but is inserted in a different predetermined position.

The packet-header analysis error checker 32 checks the analyzed packet-header information for analysis errors by checking the values of the marker bits MB1, MB2 and checking the format of the information fields (info-A1 etc.). In this way, the packet-header analysis error checker 32 determines whether the stream-header information s22 is consistent with the packet header signal s13. For example, if the stream-header information s22 specifies coding type A, then the bit at the position of marker bit MB1 should have a value of '1' and the information fields (info-A1 etc.) should have certain known lengths. If the value of the bit at the position of MB1 is not '1' or the information fields do not match the correct lengths, or if there is another inconsistency between the stream-header information s22 and the packet header contents, the packet-header analysis error checker 32 recognizes an analysis error.

In making these checks, the packet-header analysis error checker 32 may refer to the stream-header information s22 and the packet header signal s13, although this is not indicated in the drawing.

When the packet-header analysis error checker 32 finds an analysis error, it sends packet header error information s33 to the stream-header estimator 23, instructing the stream-header estimator 23 to modify the estimated stream-header information s23. The header error information s33 may simply indicate what error or errors have been found, or may include specific instructions as to how the estimated stream-header information s23 should be modified, these instructions being based on an analysis of the discrepancy between the packet header signal s13 and the stream-header information s22.

For example, in checking the block numbers given in the packet headers, the packet-header analysis error checker 32 may find a block number exceeding the maximum number of blocks allowed by the video size in the stream-header information s22. The packet-header analysis error checker 32 can then instruct the stream-header estimator 23 to increase the estimated video size.

When the packet-header analysis error checker 32 does not find an analysis error, it extracts the information necessary for decoding from the analyzed packet-header information s31, and sends the extracted information as packet-header information s32 to the packet-data decoder 41.

The packet-data decoder 41 decodes the packet data signal s14 on the basis of the packet-header information s32, and sends the decoded packet-data information s41 to the decoded-packet-data error checker 42.

The decoded-packet-data error checker 42 checks for general errors in the decoded packet-data information s42, by checking that there are not too many decoded values, for example, and checking that the decoded values do not violate rules given in the decoding tables. Errors of these general types occur when the packet data signal s14 is inconsistent with the packet-header information s32. If the decoded-packet-data error checker 42 finds a decoding error, it sends packet-data error information s43 to the stream-header estimator 23, instructing the stream-header estimator 23 to modify the estimated stream-header information. The packet-data error information s43 may include specific instructions as to how the estimated stream-header information s23 should be modified, based on an analysis of the decoding error.

When the decoded-packet-data error checker 42 does not find a decoding error, it sends decoded packet data s42 corresponding to the decoded packet-data information s41 to the output terminal 2.

The stream-header estimator 23 internally generates an initial value of the estimated stream-header information s23. When reception of the input bitstream s1 at the input terminal 1 begins, the stream-header estimator 23 loads this initial estimated stream-header information s23 into the stream-header information register 22. Thereafter, the stream-header estimator 23 modifies the estimated stream-header information s23 adaptively, according to the packet header error information s33 and packet-data error information s43. Each time a modification is made, the modified estimated stream-header information s23 is stored in the stream-header information register 22, unless the stream-header analyzer 21 obtains new stream-header information s21 at the same time.

The operation of the receiving apparatus 10 in receiving a broadcast bitstream having the format shown in FIG. 2 will now be described. It will be assumed that reception begins at time T1 in FIG. 2.

Before reception of the input bitstream s1 begins, the stream-header estimator 23 generates an initial value of the estimated stream-header information s23. This initial value is stored in the stream-header information register 22.

In principle, the number of possible values of the stream-header information is $2^N$, where N is the bit length of the information. A sixteen-bitstream header, for example, has over sixty-five thousand possible values. Some of these values are never used, however, and others are used only rarely. The video size parameter, for example, normally has one of just a few standard values (VGA, CIF, etc.) and seldom has a non-standard value. The number of different stream-header values that are at all likely to be encountered in practice is thus comparatively small, on the order of about a hundred. The stream-header estimator 23 may simply use the most common one of these values as the initial estimated stream-header information s23, or may select a particular value as the initial value on the basis of extra information, such as information identifying the source of the bitstream. When such extra information is available, the stream-header estimator 23 may be able to generate initial estimated stream-header information that has a high probability of being correct.

Reception of the input bitstream s1 begins in the midst of the packet data of packet PM. The header extractor 11 sends the packet data PDM to the packet-data decoder 41, but has no header to send to the stream-header analyzer 21 or packet-header analyzer 31 yet. Accordingly, the packet-data decoder 41 cannot decode the packet data PDM.

Next, the receiving apparatus 10 receives packet header PHM+1, which the header extractor 11 sends to the packet-header analyzer 31. The packet-header analyzer 31 analyzes this packet header according to the initial estimated stream-header information s23 stored in the stream-header information register 22. The packet-header analysis error checker 32 executes an error check on the analyzed packet-header information s31.

If the initial estimated stream-header information s23 happens to be correct, the packet-header analysis error checker 32 will not detect an analysis error, unless packet header PHM+1 has been corrupted in transmission. If the estimated stream-header information s23 is incorrect, the packet-header analysis error checker 32 may or may not detect an analysis error. If the packet-header analysis error checker 32 does not detect an analysis error, it sends packet-header information s32 to the packet-data decoder 41.

Next, the receiving apparatus 10 receives packet data PDM+1, which the header extractor 11 sends to the packet-data decoder 41. If the packet-header analysis error checker 32 did not detect an analysis error in the packet header, the packet-data decoder 41 decodes packet data PDM+1 on the basis of the packet-header information s32, and the decoded-packet-data error checker 42 checks the decoded packet-data information s41.

If the initial estimated stream-header information s23 was correct, the decoded-packet-data error checker 42 will not detect a decoding error, unless a data transmission error has occurred. If the initial estimated stream-header information s23 was incorrect, the decoded-packet-data error checker 42 may well detect a decoding error, even though the packet-header analysis error checker 32 did not detect an analysis error. This is because the packet-header analysis error checker 32 performs mainly a formal syntax check, while the decoded-packet-data error checker 42 checks the actual content of the decoded data.

If either the packet-header analysis error checker 32 or the decoded-packet-data error checker 42 detects an error in packet PM+1, the stream-header estimator 23 modifies the estimated stream-header information s23 and stores the modified information in the stream-header information register 22.

Following packet PM+1, packets PM+2 and PM+3 are processed in the same way. As each new packet is processed, the probability that it will be decoded correctly increases, as the stream-header estimator 23, packet-header analysis error checker 32, and decoded-packet-data error checker 42 accumulate more information on which estimates of the stream-header information can be based. For example, if marker bit MB1 is '0' in packet header PH+1, the stream-header estimator 23 will know that the stream header does not specify coding type A, and if marker bit MB2 is '0' in packet header PH+2, the stream-header estimator 23 will know that the stream header does not specify coding type B. In this way, the coding type can rapidly be narrowed down to the correct value.

Following packet PM+3, the receiving apparatus 10 receives stream header SHK, which the header extractor 11 sends to the stream-header analyzer 21. The stream-header analyzer 21 analyzes the stream header and stores the stream-header information s21 in the stream-header information register 22, replacing the estimated stream-header information s23. Barring transmission errors, the stream-header information s21 will be correct, no further analysis errors or decoding errors will be detected, and all of the succeeding packets will be decoded correctly.

If stream header SHK was corrupted in transmission, the packet-header analysis error checker 32 and decoded-packet-data error checker 42 will continue to detect errors, and the stream-header estimator 23 will continue to modify the estimated stream-header information s23 until the correct stream-header information is obtained.

One effect of the first embodiment is that the receiving apparatus 10 can begin decoding the packet data as soon as it is able to estimate the stream-header information correctly, without having to wait for a stream header to be embedded in the bitstream. As noted above, the number of stream header values that are at all likely to be encountered is not large, so the correct value can usually be found in a short time by a process of elimination.

Another effect is that if an embedded stream header is corrupted in transmission, the packet-header analysis error checker 32 and decoded-packet-data error checker 42 will quickly discover the error, and the stream-header estimator 23 will quickly correct it.

Another effect is that the receiving apparatus 10 can decode a bitstream of the type shown in FIG. 3, having a stream header only at the beginning, even if reception of the bitstream begins at an intermediate point and the stream header is never received. With conventional apparatus, this would not be possible.

All of these effects make the receiving apparatus 10 more convenient for the user, who can begin receiving any bitstream at an arbitrary time and does not have to wait for a stream header in order to start seeing a picture.

These effects also eliminate the need to transmit stream headers on a separate channel, so the broadcaster or other transmitting party does not have to provide a separate channel and the receiving apparatus does not require extra receiving circuits to receive the separate channel.

In a variation of the first embodiment, once an embedded stream header has been received and its information has been stored in the stream-header information register 22, the packet-header analysis error checker 32 and decoded-packet-data error checker 42 are switched off. This variation prevents the stream-header estimator 23 from modifying correct stream-header information s22 in response to a transmission error in a packet header or packet data. Since the receiving apparatus 10 may occasionally receive a corrupted stream header, this variation preferably includes a control input unit by which the user can reactivate the packet-header analysis error checker 32 and decoded-packet-data error checker 42 if the reproduced moving picture becomes distorted.

Figure 7:
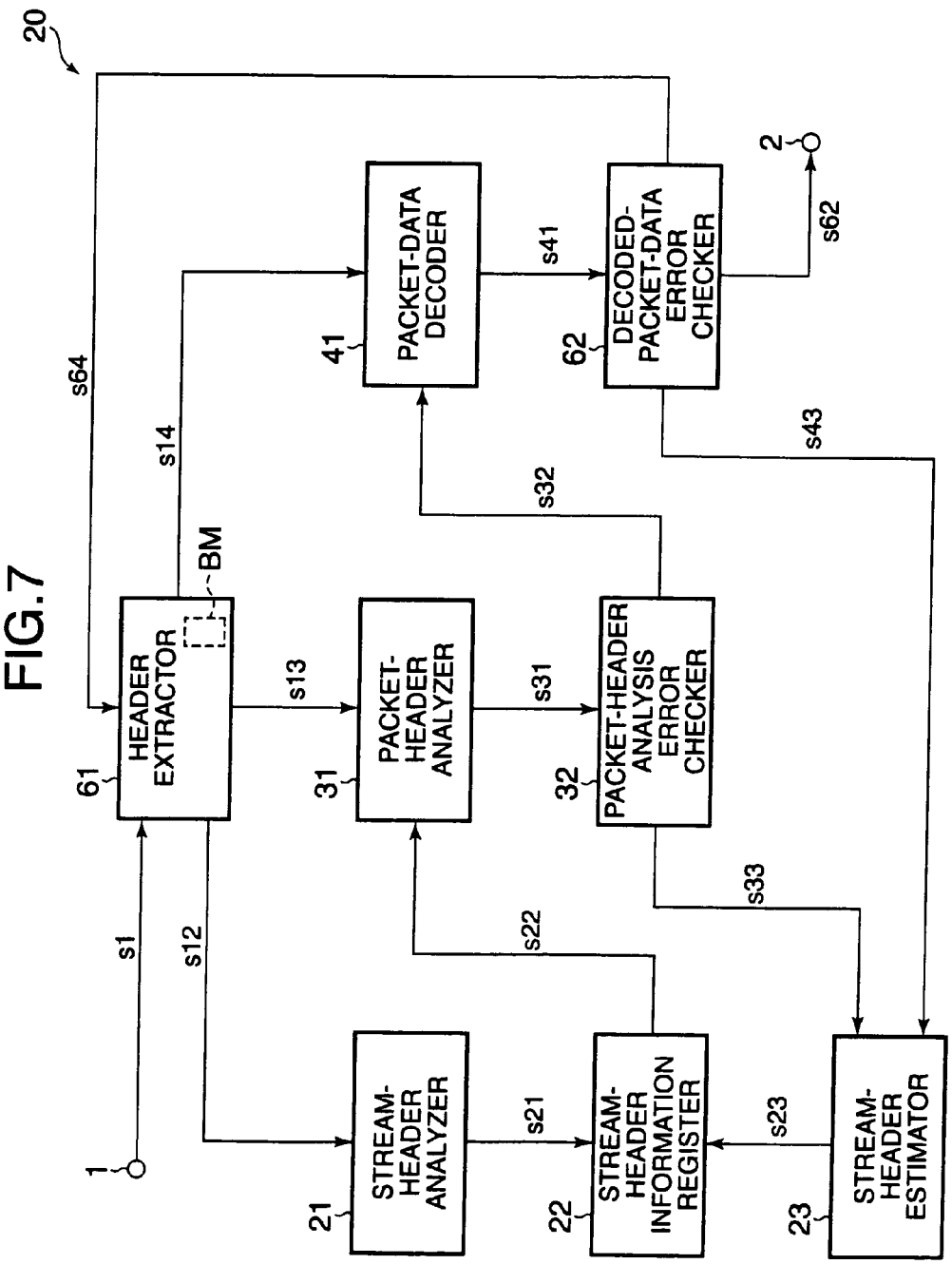
FIG. 7 is a block diagram of another receiving apparatus embodying the present invention.

Referring to FIG. 7, a second embodiment is a receiving apparatus 20 that has the same structure as the first embodiment, except for the header extractor 61 and decoded-packet-data error checker 62.

The header extractor 61 includes a buffer memory BM with sufficient capacity to store at least one packet. After being sent to the packet-header analyzer 31 and packet-data decoder 41, each packet is retained temporarily in the buffer memory BM.

The decoded-packet-data error checker 62 performs the same functions as the decoded-packet-data error checker 42 in the first embodiment, but when it detects a decoding error, besides sending packet-data error information s43 to the stream-header estimator 23, it sends a decode-again command signal s64 to the header extractor 61. Upon receiving this signal s64, the header extractor 61 reads the erroneously decoded packet from the buffer memory BM, sends the packet header to the packet-header analyzer 31, and sends the packet data to the packet-data decoder 41.

In other respects, the second embodiment operates in the same way as the first embodiment.

If the decoded-packet-data error checker 62 finds an error in the information decoded from packet data PDM+3, for example, it notifies the stream-header estimator 23 and header extractor 61. The stream-header estimator 23 modifies the estimated stream-header information s23 in a way that maintains consistency with packet header PHM+3, and stores the modified stream-header information in the stream-header information register 22. The packet-header analyzer 31 analyzes packet header PHM+3 again on the basis of the new stream-header information s22, and the packet-header analysis error checker 32 sends the resulting new packet-header information s32 to the packet-data decoder 41. The packet-data decoder 41 decodes the packet data PDM+3 again on the basis of the new packet-header information.

The decoded-packet-data error checker 62 may detect another error in the newly decoded packet data. The decoded-packet-data error checker 62 then sends a second decode-again command signal s64 to the header extractor 61, and the header extractor 61 sends packet header PHM+3 to the packet-header analyzer 31 and packet data PDM+3 to the packet-data decoder 41 for a third time, while the stream-header estimator 23 again modifies the estimated stream-header information s23. This process may be repeated any number of times, until a predetermined condition is satisfied: for example, until the decoded-packet-data error checker 62 fails to detect an error, or until a predetermined limit number of repetitions is reached. When the condition is satisfied, the decoded-packet-data error checker 62 sends decoded packet data s62 to the output terminal 2.

If the decoding of a packet is repeated until no decoding errors are detected, high picture quality is maintained, but there may be a delay in the output of the decoded packet data s62, and a large buffer memory BM may be required to store additional packets that arrive in the interim.

If a limit condition is set on the number of decoding repetitions, the decoded-packet-data error checker 62 may detect errors in all of them. In that case, the decoded-packet-data error checker 62 preferably selects the decoded data with the least serious error for output as the decoded packet data 62. For this purpose, the decoded-packet-data error checker 62 has a buffer memory (not visible) for storing the decoded data, and has means (not visible) for comparing the relative severity of different errors. An appropriate repetition limit can avoid delays in the output of the decoded packet data s62, but some loss of picture quality may be unavoidable.

The repetition termination condition may be a compound condition, such as error-free decoding or a limit number of repetitions or reception of an embedded stream header. The appropriate condition also depends on the rate at which packets arrive and the speed with which they can be decoded. Regardless of what condition is used, however, the second embodiment tends to produce better picture quality than the first embodiment.

The second embodiment provides the same effects as the first embodiment, with the additional effect of faster convergence of the estimated stream-header information s23 to the correct value. In many cases, the correct stream-header information can be obtained from only one packet, although the packet may have to be decoded several times.

Besides obtaining a better-quality picture, accordingly, the user is able to start seeing the picture sooner than in the first embodiment. The second embodiment is even more convenient and reliable than the first embodiment.

Figure 8:
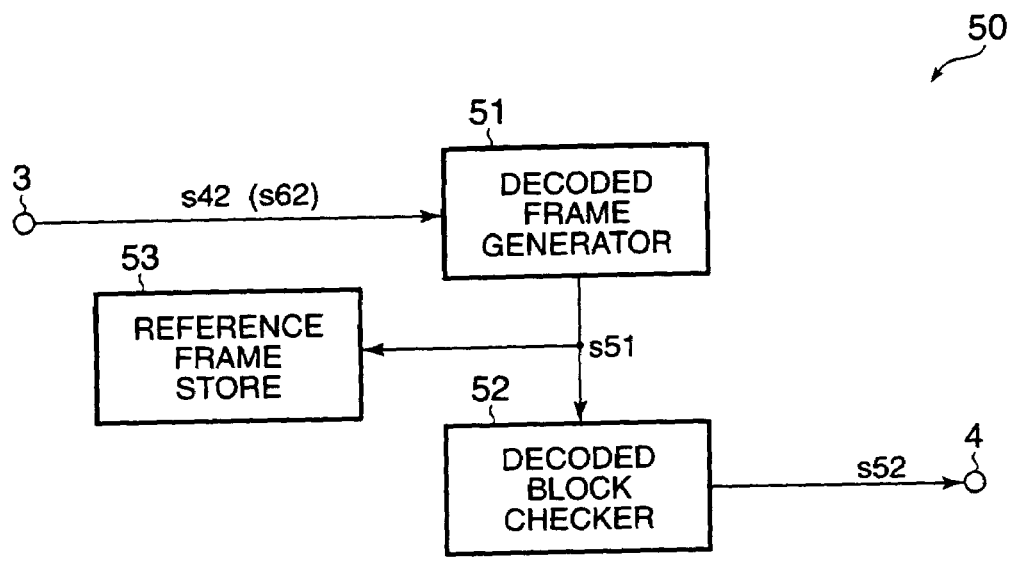
FIG. 8 is a block diagram of a picture output apparatus embodying the present invention.

A third embodiment employs the receiving apparatus of either the first or second embodiment, and the picture output apparatus 50 shown in FIG. 8. The picture output apparatus 50 has an input terminal 3 coupled to the output terminal 2 of the receiving apparatus, and an output terminal 4 coupled to a display device (not visible) having a screen on which the moving picture is displayed. In other words, the picture output apparatus 50 is inserted between the receiving apparatus and the display device. The picture output apparatus 50 assembles the decoded packets into frames.

The picture output apparatus 50 comprises a decoded frame generator 51, a decoded block checker 52, and a reference frame store 53.

The decoded frame generator 51 receives decoded packet data s42 (or s62) from the input terminal 3, and generates decoded frame data s51. As noted earlier, when a frame is coded, it is normally divided into blocks. Each packet normally contains data for several blocks. The decoded frame generator 51 puts each decoded block into its correct position in the frame.

The reference frame store 53 stores the decoded frame data s51 for use in the decoding of later frames. If a frame can be only partly decoded, the frame store 53 stores the decodable blocks in the frame.

The decoded block checker 52 treats a decoded frame received from the decoded frame generator 51 as a candidate output frame, thereby functioning as an output candidate checker. By comparing the candidate output frame with the decoded frame data stored for reference in the reference frame store 53, the decoded block checker 52 checks whether each block in the decoded frame s51 was decoded without reference to a block that could not be decoded because of packet loss or the like. If this check passes for all blocks in the candidate output frame, the decoded block checker 52 sends the candidate output frame to the output terminal as decoded picture data s52. If this check does not pass, the decoded block checker 52 does not output the candidate output frame.

When part of a frame is missing due to packet loss or the like, instead of always continuing to display the preceding frame until the next intra-frame is received, a practice used in the prior art, the third embodiment examines succeeding frames block by block, and displays each frame if none of its blocks were decoded with reference to missing data. Used in combination with a coding method that regularly inserts intra-blocks into frames, for example, the third embodiment can enable early recovery of a moving picture display by interpolation following packet loss, avoiding unnaturally prolonged freezing or blanking of the displayed picture.

Similarly, by storing decodable blocks for reference, the frame store 53 enables picture display to begin more quickly than in conventional apparatus that waits for reception of a complete intra-frame.

Figure 9:
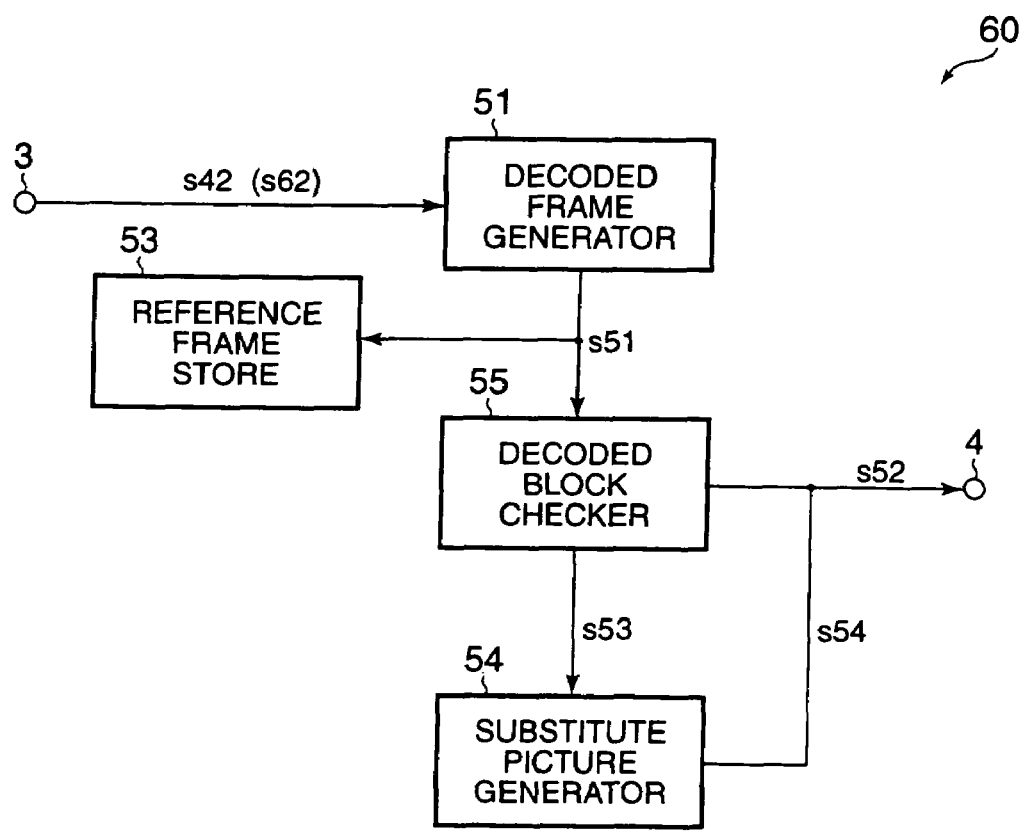
FIG. 9 is a block diagram of another picture output apparatus embodying the present invention.

Referring to FIG. 9, the fourth embodiment adds a substitute picture generator 54 to the structure of the third embodiment shown in FIG. 8, and replaces the decoded block checker 52 of the third embodiment with a different decoded block checker 55. The other parts of the picture output apparatus 60 in FIG. 9 operate as described in the third embodiment.

The decoded block checker 55 performs the same functions as the decoded block checker 52 in the third embodiment, but also sends check status data s53 to the substitute picture generator 54.

The substitute picture generator 54 uses the check status data s53 to generate a substitute picture when the decoded block checker 55 decides not to output the decoded picture data s52. The substitute picture may include, for example, a message informing the viewer that the picture is temporarily unavailable, a message indicating the reason for the temporary unavailability, or a graph indicating progress toward recovery of the moving picture. The substitute display can report not only transmission problems such as packet loss, but also internal problems such as processing delays. The substitute picture is supplied to the output terminal 4 in place of the decoded picture data s52.

When the moving picture is lost for an extended period, the substitute picture generator 54 updates the substitute picture during that period, according to successive check status data s53 received from the decoded block checker 55. The user is thereby shown meaningful information that changes with time, instead of being left to watch a blank or frozen display.

The fourth embodiment provides the same effect as the third embodiment, with the additional effect that when the normal moving picture cannot be displayed, the user is provided with information about the cause of the problem and/or progress toward its solution. This is much less disconcerting to the user than is the sudden and unexplained disappearance or freezing of the picture.

The invention as described above is useful in receiving and reproducing bitstreams coded according to the MPEG-4 standard recommended by the Moving Picture Experts Group (MPEG), but is not limited to bitstreams of that type, and can be applied to bitstreams conforming to many other standards.

The bitstream need not be divided into frames and packets, but can be divided into other units such as fields and cells. A field comprises, for example, the even or odd raster lines in a frame. A cell is, for example, a fixed-length unit employed by communication systems adhering to the asynchronous transfer mode (ATM).

The picture output apparatus 50 and 60 shown in the third and fourth embodiments need not be connected to the receiving apparatus 10 and 20 shown in the first and second embodiments, but can be connected to any type of moving-picture processing apparatus that includes a packet decoding function.

The invention can be practiced in either hardware or software.

Those skilled in the art will recognize that further variations are possible within the scope claimed below.

What is claimed is:

1. A receiving apparatus receiving a bitstream that is divided into units encoding a moving picture and includes a stream header indicating how the units are to be decoded, wherein at least one unit among said units includes a unit header, wherein each unit among said units includes unit data and wherein the decoder decodes the unit data according to the analyzed unit-header information, and generates decoded unit data, the apparatus comprising:
   a stream-header estimator that estimates contents of the stream header from contents of the units, and generates estimated stream-header information;
   a decoder that decodes the units according to the estimated stream-header information before the stream header is received;
   a unit-header analyzer that analyzes the unit header according to the estimated stream-header information, and generates analyzed unit-header information;
   a first error checker that checks the analyzed unit-header information for errors, and instructs the stream-header estimator to modify the estimated stream-header information if an error is found; and
   a second error checker that checks the decoded unit data for errors, and instructs the stream-header estimator to modify the estimated stream-header information if an error is found in the decoded unit data.

2. The receiving apparatus of claim 1, wherein the second error checker causes the decoder to decode the unit data of a single unit repeatedly, until a predetermined condition is satisfied, and instructs the stream-header estimator to modify the estimated stream-header information repeatedly, until the predetermined condition is satisfied.

* * * * *